United States Patent
Tam et al.

(10) Patent No.: US 8,313,076 B2
(45) Date of Patent: Nov. 20, 2012

(54) COLLAPSIBLE ROLLING SUPPORT STAND

(75) Inventors: Ramon Tam, Chicago, IL (US); Brian Taylor, Mount Prospect, IL (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/349,913

(22) Filed: Jan. 13, 2012

(65) Prior Publication Data

US 2012/0175861 A1 Jul. 12, 2012

Related U.S. Application Data

(63) Continuation of application No. 10/800,293, filed on Mar. 12, 2004, now Pat. No. 8,096,519.

(51) Int. Cl.
*B62B 1/12* (2006.01)

(52) U.S. Cl. ........ 248/434; 248/128; 248/165; 248/439; 280/40

(58) Field of Classification Search ................... 248/128, 248/421, 165, 434, 439, 188.2, 188.6; 280/40, 280/43, 30, 41
See application file for complete search history.

(56) References Cited

U.S. PATENT DOCUMENTS

| | | | |
|---|---|---|---|
| 5,067,535 A | 11/1991 | Wolff | |
| 5,087,013 A | 2/1992 | Gress et al. | |
| 5,275,365 A | 1/1994 | Gerbel et al. | |
| 5,509,159 A | 4/1996 | Du-Bois | |
| 5,863,052 A | 1/1999 | Roman | |
| 5,927,745 A | 7/1999 | Cunningham | |
| 6,471,236 B1 | 10/2002 | Eskridge | |
| 6,575,155 B2 | 6/2003 | Brennan | |
| 6,578,856 B2 | 6/2003 | Kahle | |
| D486,504 S | 2/2004 | Huang | |
| 6,725,855 B1 | 4/2004 | Brennan | |
| 6,942,229 B2 | 9/2005 | Brazell et al. | |
| 2002/0011719 A1 | 1/2002 | Eskridge | |

FOREIGN PATENT DOCUMENTS

DE 202 02 397 U1 8/2002

*Primary Examiner* — Terrell McKinnon
*Assistant Examiner* — Steven Marsh
(74) *Attorney, Agent, or Firm* — Greer, Burns & Crain, Ltd.

(57) ABSTRACT

A collapsible folding stand for use with an object that is attached to the stand. In the closed position, the stand is generally vertically oriented with the object attached to a top frame. To open the stand a locking mechanism is released which enables a folding mechanism supporting the top frame to unfold in a manner whereby the rear legs having wheels that separate from forward side struts which contact the ground, with the center of gravity of the object being positioned between the wheels and the front ground contact points so that the weight of the object tends to separate the same and bring the top frame into a generally horizontal position. To move the stand to its closed position, the handle is lifted to move the top frame to its generally vertical closed position.

7 Claims, 15 Drawing Sheets

COLLAPSIBLE ROLLING SUPPORT STAND

This patent is a Continuation application of U.S. application Ser. No. 10/800,293, which was filed on Mar. 12, 2004.

BACKGROUND OF THE INVENTION

The present invention generally relates to rolling support stands.

Rolling hand trucks or support stands for large and/or heavy objects have been known for decades and are useful for transporting such objects from one location to another. Some of such known support stands are collapsible to some degree and many different designs of the hand trucks or rolling support stands are particularly suited for specific uses. While such products may be used in many different industries and applications, one noteworthy use is that of transporting objects, such as portable table saws, miter saws and the like to and from construction sites.

In the home building trade, carpenters generally have table saws as well as other types of saws that are brought to a jobsite every day in the tradesman's truck or are stored in a secure location at the jobsite and must be removed from the truck or stored location and be set up on the jobsite while work is being done. At the end of the work day, the tradesman must pack up the saw and return it to his truck or secure location for safe keeping. Because such tools are valuable, they cannot be left unattended overnight without a significant risk of theft.

There is also an issue of setting up the saw at the worksite. Even though early prior art roll stands or hand trucks may help the tradesman to move the saw to the desired location, it was often necessary to have a table or other surface, such as wooden planks resting on saw horses or the like to bring the saw to a convenient working height during use. Although more recent designs have evolved which have a rolling stand that can be unfolded to support the saw at an appropriate working height, all known designs that double as a stand require the tradesman to lift a substantial portion of the weight of the saw which is typically relatively heavy.

Most portable table saws are very similar in design to standard table saws except they do not have a stand with legs beneath them and must be supported by a separate structure. Such portable table saws are rugged commercial tools that are built for an extended useful life and are therefore relatively heavy. Typical table saws of this type may weigh 60 pounds or more. While most tradesmen can usually lift 40-60 pounds, such exertion is inconvenient and perhaps dangerous in certain circumstances.

Other types of stands may unfold using a spring biasing mechanism that is released and which then supplies a major force tending to place the stand with the saw attached to it in its proper working generally horizontal position. However, stands of this type may be dangerous if the folded stand has the mechanism released when the weight of the saw is not over the stand mechanism. If there is no load on the mechanism, it can unfold very rapidly which can be quite dangerous if a tradesman or any other person is struck by the mechanism.

SUMMARY OF THE INVENTION

Several embodiments of the present invention comprise a collapsible folding stand for use with a horizontally oriented object such as a portable table saw that is attached to the stand wherein the stand has a front and a rear portion and is capable of being manipulated between open and closed positions. In the closed position, the stand is generally vertically oriented with the object attached to a top frame. The stand has a folding mechanism with a pair of wheels which enable a user to roll the stand with the attached object from one location to another. When the stand is in the desired location, a locking mechanism is released which enables a folding mechanism supporting the top frame to unfold in a manner whereby the rear legs having wheels that separate from forward side struts which contact the ground, with the center of gravity of the object being positioned between the wheels and the front ground contact points so that the weight of the object tends to separate the same and bring the top frame as well as the object into a generally horizontal position.

To move the rolling stand to its closed position, the user needs only to lift the handle and the top frame will then move to its generally vertical closed position where the latching mechanism can then be engaged. Because of the mechanism advantage of the folding mechanism, moving between the open and closed positions in either direction requires very little effort by the user.

Selected embodiments can have a tension spring attached to frame members which is placed in tension only when the stand is in its open position with the force of the spring further aiding movement of the stand to its closed position. A smaller almost zero force may only be required by the user to close the stand.

DETAILED DESCRIPTION

Figure 1:
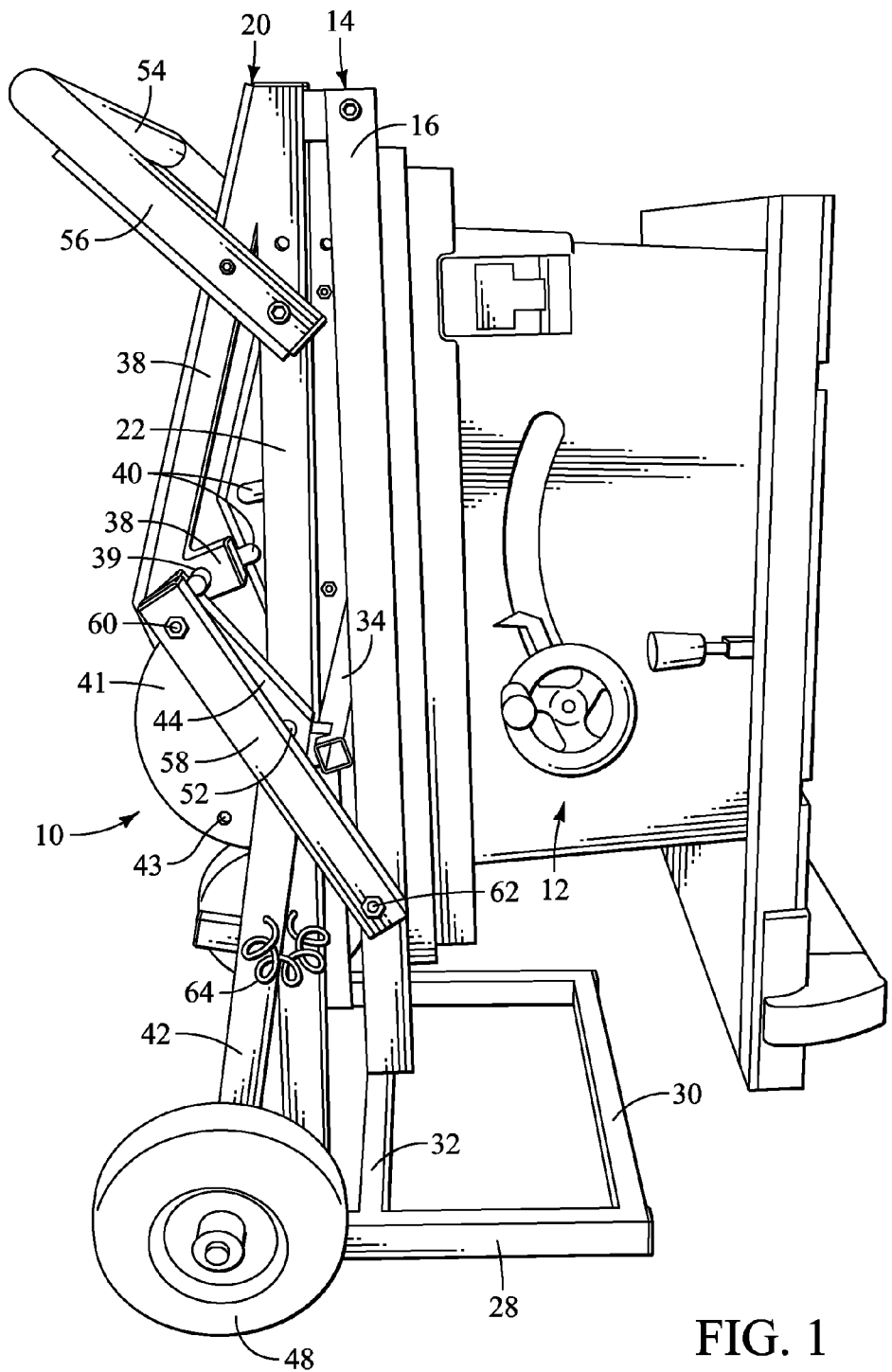
FIG. 1 is a side view of a first preferred embodiment shown with a portable table saw attached to its top frame with the rolling stand being in its locked closed position.

The various embodiments of the collapsible rolling stand of the present invention have the common design feature that includes a top frame upon which an object such as a table saw or the like can be attached and a folding mechanism that includes at least first and second members that are pivotable relative to one another and which resemble a scissor movement, with the center of gravity of the object that is attached to the top frame being located between the ground contacting ends of each of the first and second members. This enables the weight of the object to assist the unfolding of the stand which causes the object to move from a generally vertically oriented position to a generally horizontal position. Because the center of gravity of the object is between the ground contacting ends of the first and second members, the stand can be easily folded back to the collapsed generally vertical position without significant exertion by a user performing either operation. Unlike many prior art rolling stands, the user does not have to provide any heavy lifting in order to set up or break down the stand with the object attached to it. In this regard, a user can completely set up or knock down the stand by holding the handle and gently urging it in one direction or the other to open or close it. It is only necessary to manipulate a locking mechanism to release it from a closed position and to lock it when it has been moved from an opened position to its closed position.

Turning now to the drawings and particularly FIGS. 1-4, a first preferred embodiment of a collapsible rolling stand is shown at 10 and has a portable table saw 12 that is attached to the stand. The stand 10 has a top frame 14 which is comprised of two side members 16 and two end members 18.

The table saw 12 is commonly referred to in the trade as a portable table saw in that it does not have legs or a particularly deep lower frame portion. The saw 12 is intended for commercial use and is often set up at a job site such as where a house is being constructed so that carpenters or other tradesman can cut lumber as needed during the construction. The saw 12 has bolt holes (not shown) at the outer corners of the base of the saw through which bolts are placed to both the saw onto the top frame 14 of the stand 10. The bolts may fit into openings in the side members 16 or the end members 14 or to cross struts that may be added to the top frame for providing additional strength and/or a suitable structure to which the saw 12 can be attached.

The rolling stand 10 has a folding mechanism, indicated generally at 20, which supports the top frame 14 referring to FIGS. 1-4, the building mechanism has opposite sides that are substantially similar to one another and for that reason will be given the same reference numbers for the individual components of each side. Each side has a main side strut 22 that extends from a pivot connection 24 to the top frame 14 and also downwardly to an end 26 that contacts the ground. The lower portion of main side strut 22 has a transverse platform extension 28 that is connected to the other side by a front end bridge 30 and a cross brace 32. The platform extensions 28 and front end bridge 30 and cross brace 32 define a platform or shelf on which the user may place a tool box or other object. It should also be understood that a sheet material may be connected to the components 28, 30 and 32 so that objects that are smaller than these components may easily be carried on the platform.

Figure 4:
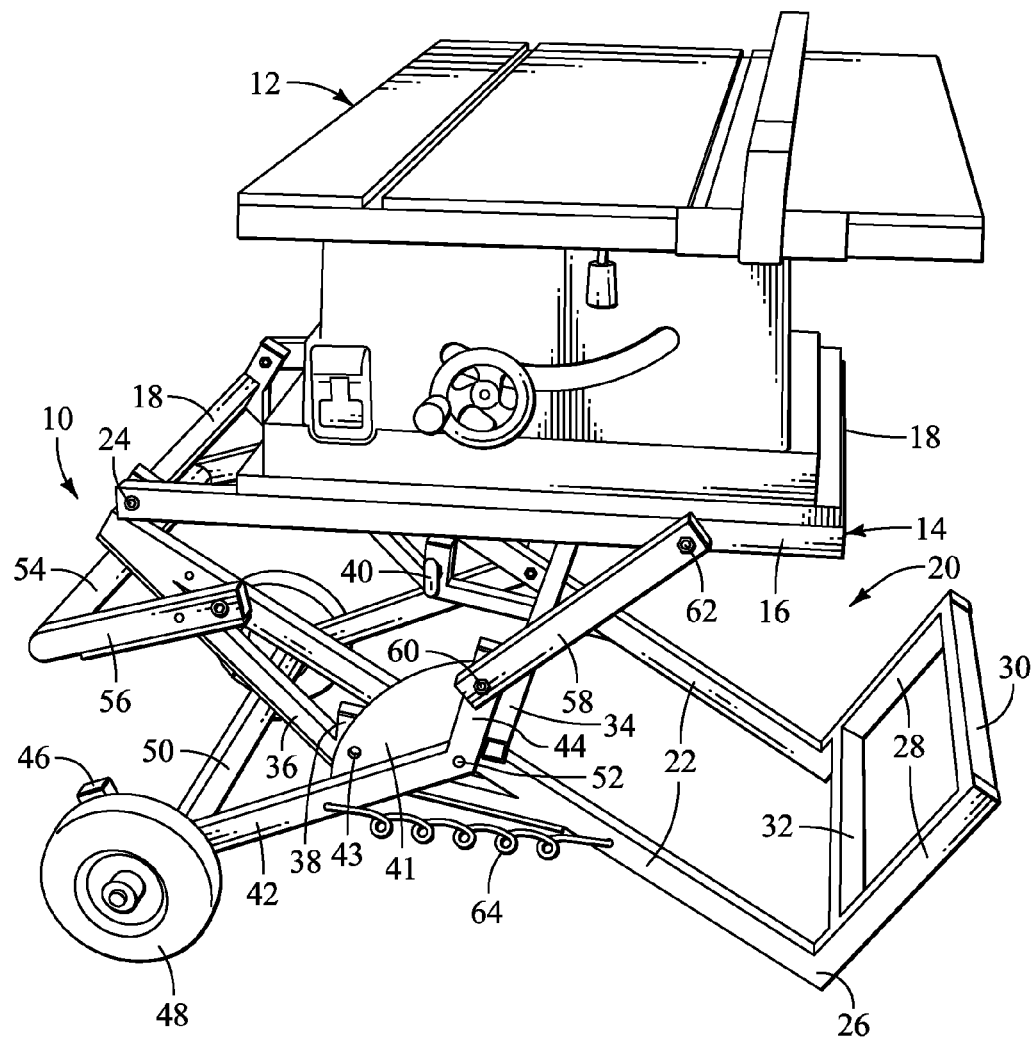
FIG. 4 is a side view of the first preferred embodiment and table saw fully opened.

A second cross brace 34 interconnects the main side struts 22 to provide strength at the mid portion of the length of the side struts 22 and to provide a stop surface for at least partially limiting the opening movement no further than is shown in FIG. 4. Additional strength is also provided by an angled auxiliary side strut 36 that has a generally transverse extension 38, a locking handle 40 that has a pin extending in an opening 39 through the extension 38 that is spring biased so that the handle 40 is biased toward the extension 38. It should be understood that a handle 40 could be provided only on one side if desired. The stand has a rear leg 42, with an angled upper leg extension 44 and a lower transverse extension 46 to which a wheel 48 is attached. The wheel 48 is mounted on an axle that is either bolted or welded to the extension 46. A rear end bridge 50 interconnects the rear legs 42 and the rear legs are connected to the side strut 22 by a connection point 52 so that the rear leg can pivot relative to the side strut 22.

A flat curved sheet 41 is attached to both the extension 44 and the adjacent portion of the rear leg 42, preferably by welding, although it can be attached in other ways that are well known to those of ordinary skill in the art. The sheet is preferably about 2 millimeter thick steel that is attached to be coplanar with the inside surface of the extension 44 and rear leg 42. The rod portion of the handle 40 is configured to engage an aperture 43 in the sheet 41 when the stand is fully open as shown in FIG. 4. This firmly locks the stand so that it can withstand forces that may be applied to it during use of the saw by a user. When the stand is in its closed position, the rod portion of the handle 40 aligned to extend past the right edge of the extension 44 as shown in FIG. 1, which prevents the rear leg 42 from rotating in the clockwise direction around pivot connection 52. In other words, the stand is locked in its closed position in this manner.

A handle 54 extends from side arms 56 that are connected to the main side strut 22 as well as the auxiliary side strut 36 and it extends away from the side struts several inches so that the hands of the user are not interfered with by the end member 18. The handle 54 is positioned at the rear end of the stand so that when it is in its closed position, the user can roll the stand and the attached table saw easily in much the same manner as a hand truck is used. A link member 58 is pivotally connected to the leg extension 44 at connection 60 and to the top frame side member 16 by connection 62.

Figure 2:
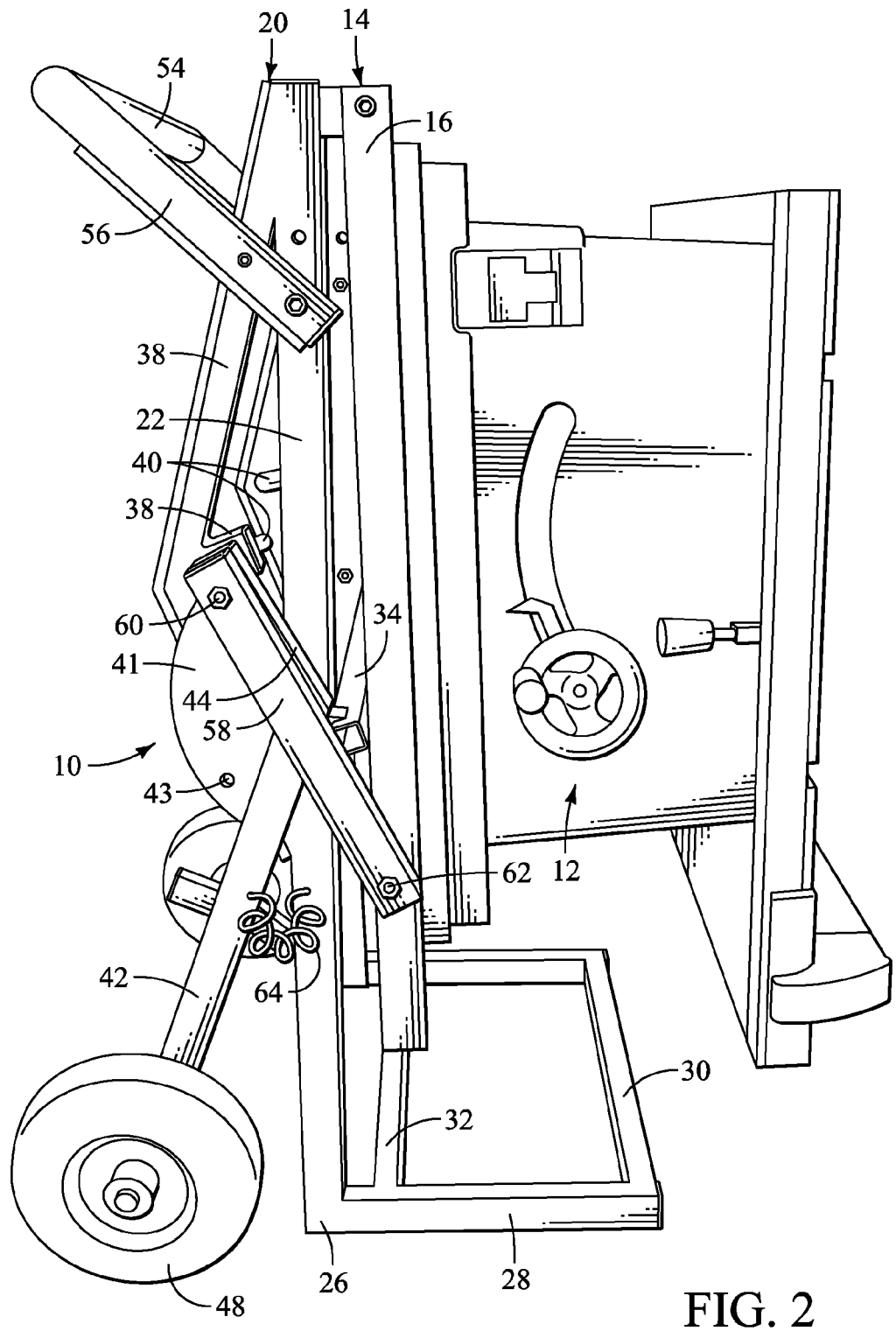
FIG. 2 is a side view of the first preferred embodiment and table saw shown in a partially opened position, particularly the position that is achieved after the latching mechanism is released.
Figure 3:
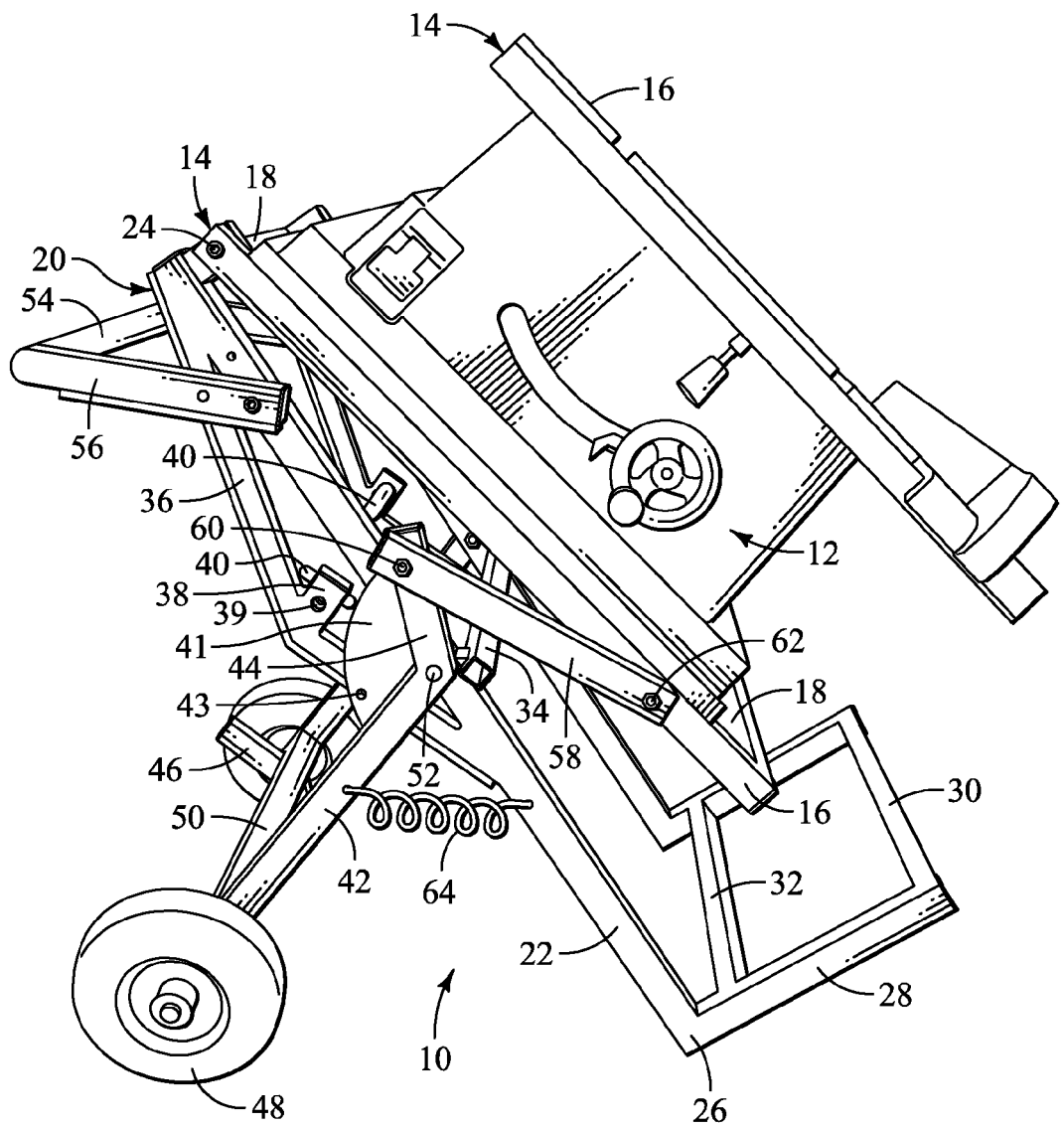
FIG. 3 is a view of the first preferred embodiment and table saw with the stand being further opened.

To open a closed rolling stand 10 which is shown in FIG. 1, the operator pulls the handles 40 so that the main side strut 22 and rear leg 42 can pivot relative to one another around the pivot connection 52. When that happens, the wheels will normally separate a short distance as a result of the weight of the stand and saw causing the rear leg and wheel to move to the left as shown in the drawings. In this regard, when this embodiment of the stand is in the position shown in FIG. 1, the wheels 48 preferably extend slightly lower than the bottom of the extension 28, so that the contact point 26 is not touching the ground. When the handles 40 are released, the saw then will move to the position shown in FIG. 2 where the platform extension 28 is flat on the ground and the wheels are spaced away from the contact point 26. From the position shown in FIG. 2, a user merely needs to pull on the handle toward him and to the left as shown in FIG. 2 which will cause the rear leg 42 to rotate in a clockwise direction relative to the side strut 22 and as it is moved, the extension 44 of the rear leg will similarly rotate in a clockwise direction and cause the link member 58 to move the right end of the top frame upwardly as is shown by comparing the position of the stand in FIG. 3 relative to FIG. 2. As the handle is moved farther to the left and boundwardly, the top frame is brought into a horizontal position which is stopped by the contact between the leg extension 44 and the cross brace 34 and the pin portion of the handle 40 engages the opening 43 in the sheet 41 as is clearly shown in FIG. 4. In this position, the table saw is ready for use once a source of power is provided to it. A significant advantage of the rolling stand 10 is the fact that the center of gravity of the saw is located between the contact point 26 and the wheels very early in the process of opening the stand and because of that, the weight of the saw assists in the unfolding of the saw to its open position which minimizes the effort that is required by the user to open the stand.

To close the stand, the operator merely needs pull the handle 40 and pull upwardly on the handle 54 and the rear legs 42 will rotate in a counterclockwise direction relative to the main side strut 22 and move in the reverse sequence from FIGS. 4 to 1 whereupon pin of the handle 40 engages the rear leg to lock the stand in its closed position. Because of the design of this embodiment, there is very little effort required to move the stand from its open to its closed position, but a modification can be made to this embodiment by placing a tension spring 64 between the main side strut 22 and the rear leg 42 which will provide an auxiliary biasing force tending to both the stand from its open to its closed position. An axial spring provided at the connected point 52 may also be used as an alternative to the tension spring 64.

The spring 64 can be designed so that it provides sufficient biasing force tending to rotate the rear leg in a counterclockwise direction relative to the main side strut 22 so that only a very small force, i.e., one approaching zero, may be necessary to close the stand from its open position. It should also be understood that a spring may be provided on each side of the stand to provide a more balanced closing force. Unlike some prior art rolling stands, the configuration of the spring in this embodiment only loads the spring when it approaches the open position. Other prior art mechanisms include a spring opening mechanism that once released causes the stand to unfold, with the force of the mechanism being substantial. When the stand is in the proper position this usually does not create a problem, but if the stand is not properly positioned, release of the mechanism can cause it to rapidly unfold with sufficient speed and energy that it can easily injure the user if the user is in position to be struck. That condition is virtually impossible in the illustrated embodiment for the reason that the spring is never loaded until it approaches its open position.

The handle 54 is also positioned at an angle relative to the link of the side strut 22. This provides a convenient contact point for the stand if a user wishes to load the stand and saw into the cargo area of a truck or van. The user can merely wheel the stand to the truck, turn it around so that the handle is near the cargo truck surface and it can be rotated toward the truck so that the handle provides a sliding surface and the user can then pick up the cart by the front end bridge 30 and load it into the cargo area.

The first preferred embodiment 10 is shown to have been constructed of hollow steel extrusions that are welded together and with the pivot connections comprising bolts extending through the illustrated components. A more substantial connection with bearings or other friction reducing elements can be used as are known to those of ordinary skill in the art. The side arms 56 are shown to be firmly attached by screws or bolts. The nature of the attaching and pivoting connections can vary depending upon obvious engineering design that is well know to those of ordinary skill in the art.

A second preferred embodiment which represents a sleeker, smoother design that may be less expensive to manufacturer is shown in FIGS. 5-8. In this embodiment, a rolling stand, indicated generally at 100, is shown without an object attached to it, but it has a top frame, indicated generally at 102, that comprises side members 104 as well as an end member 106 to which two flat mounting plates 108 and 110 are attached. In this embodiment, the stock frame 102 is made of a circular stock and the side members 104 and the end member 106 are a unitary structure that is bent to form the top frame. The plates are preferably made of 2 mm. thick sheet, but may be a thinner or thicker steel stock or can be made of other metal. An important criterion is that it should be sufficiently strong that a saw or other object can be bolted to either pre-made holes or holes that are drilled in the plates when the saw or other object is attached to it.

The embodiment 100 also has a folding mechanism 112 that includes a main side strut 114 that is pivotally attached to the top frame by pivot connection 116 and extends downwardly to a ground contact 118. A platform extension 120 is also provided and it has a end bridge 122 that interconnects the platform extension of each side. A metal platform bed 124 is connected to the end bridge 122 and platform extensions 120. It also has a horizontal portion 126 and a rear portion 128 that is generally perpendicular to the plane of the platform 124. These sheet surfaces provide support for carrying other articles or equipment that a user may have, such as a tool box, lunch box, radio or the like. The main side strut 114 extends upwardly to the connections 116 beyond which they are formed into generally transverse handle extension 130 that merges with a curved handle 132. The handle has a general upward curve as shown in the drawings, this is not only ergonomically convenient, but also defines two lower contact points 134 that may facilitate the stand being loaded onto an elevated platform such as a cargo floor of a truck or van.

Figure 5:
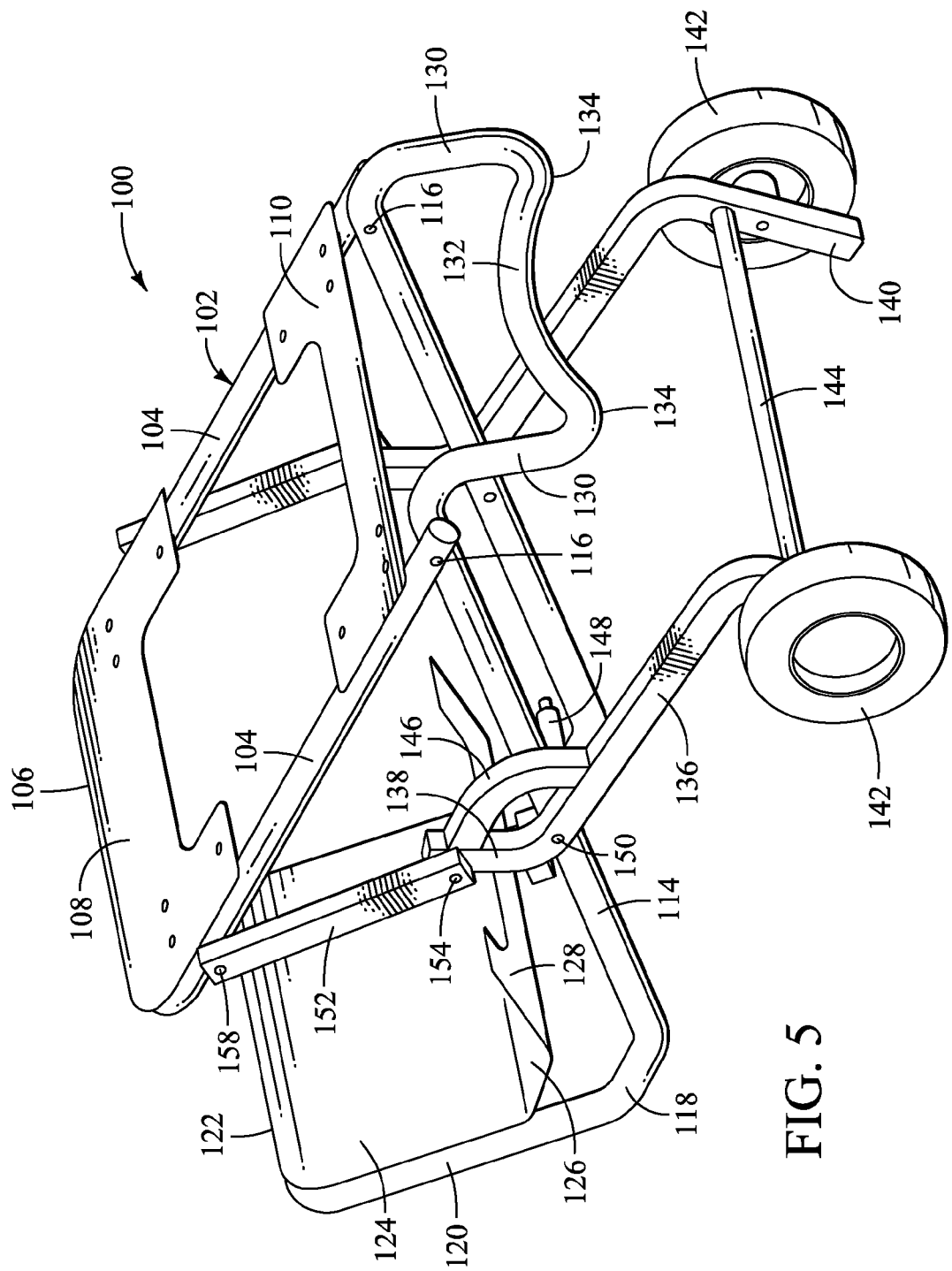
FIG. 5 is a rear and side perspective view of a second preferred embodiment of a collapsible stand which represents a more stylized and commercial version of the first preferred embodiment shown in FIGS. 1-4.
Figure 6:
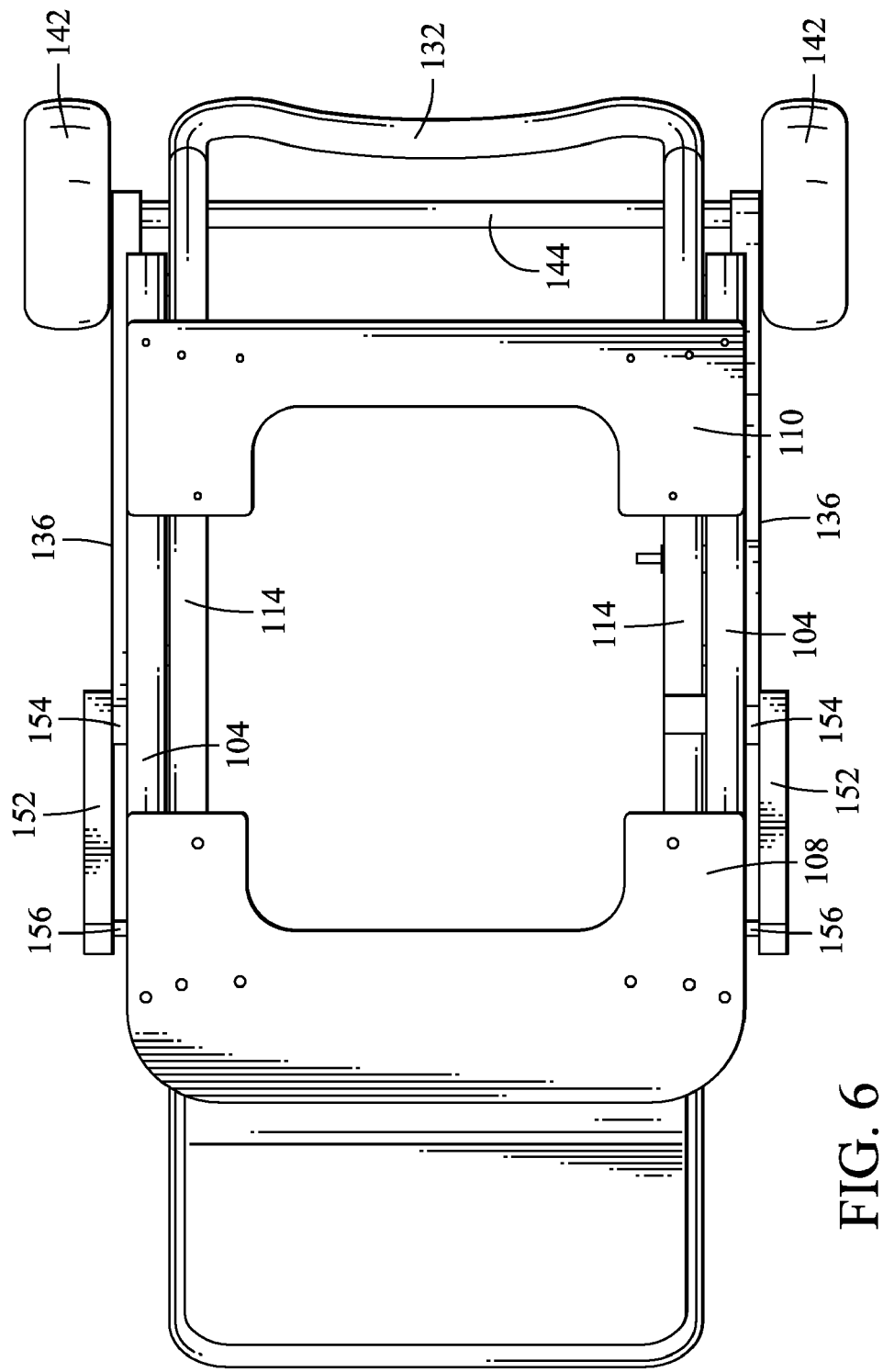
FIG. 6 is a top view of the second preferred embodiment.
Figure 7:
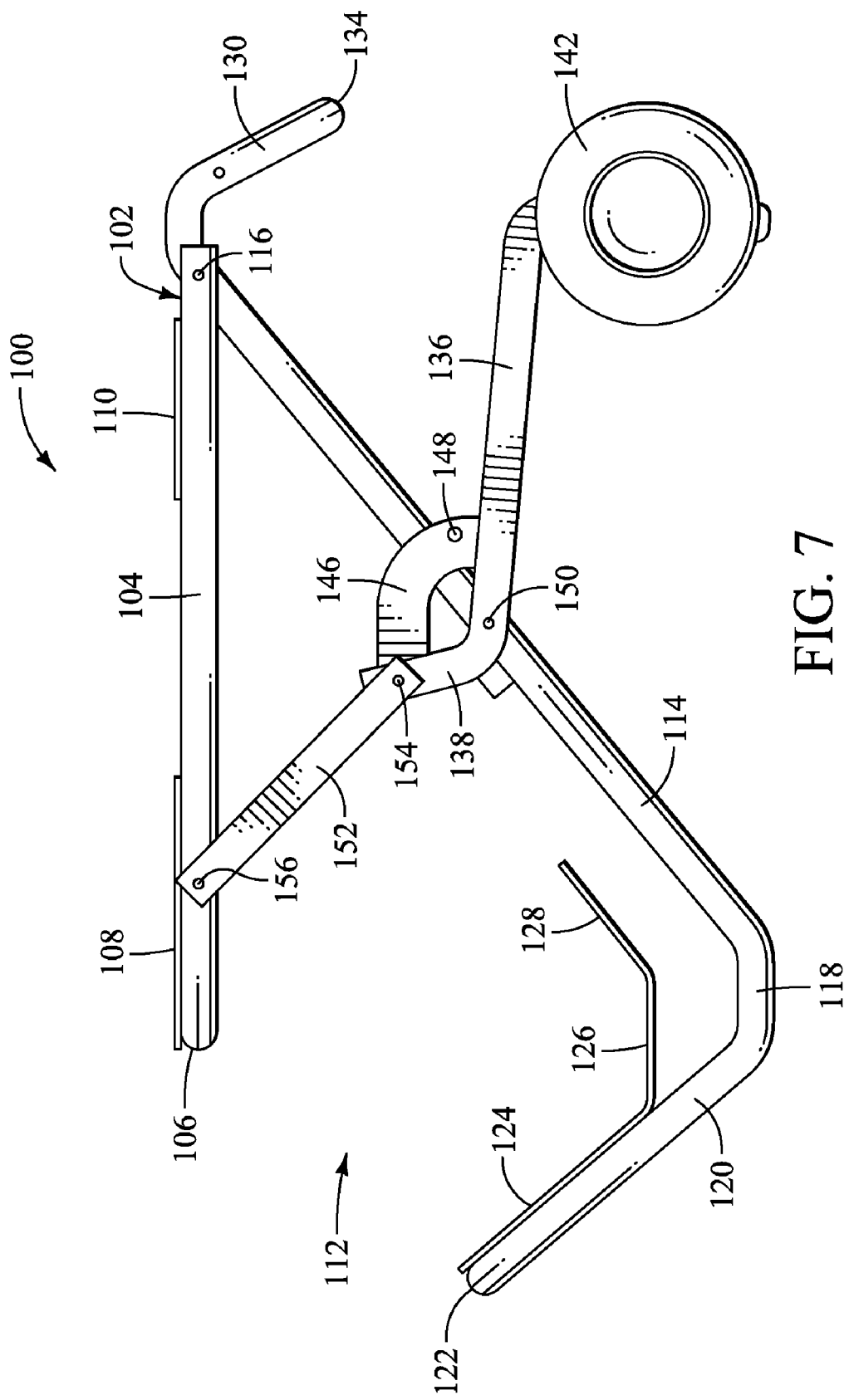
FIG. 7 is a side view of the second preferred embodiment.
Figure 8:
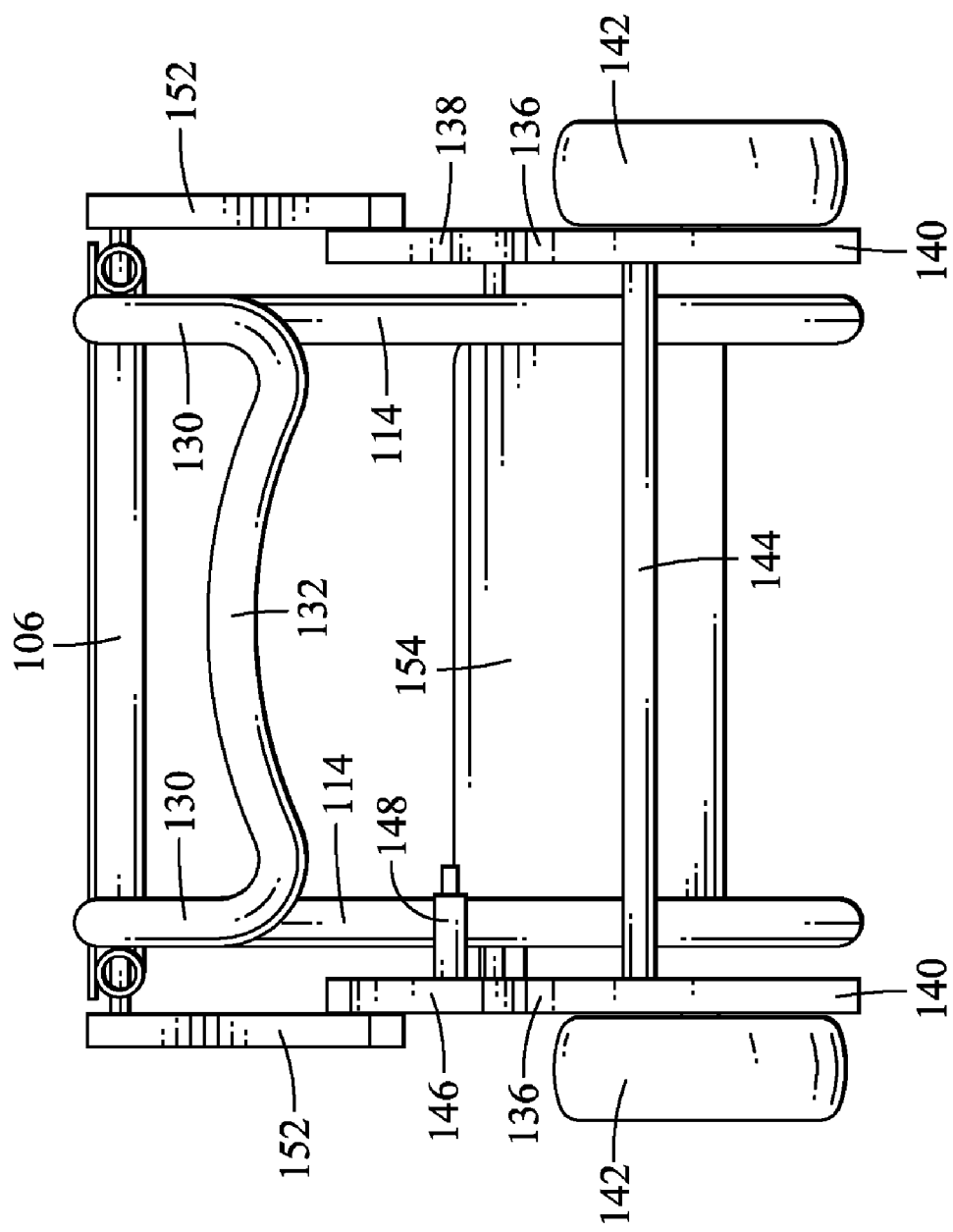
FIG. 8 is a rear end view of the second preferred embodiment.

This embodiment also has a rear leg 136 with a leg extension 138 that is angled approximately 70°, but which could be a greater or lesser angle depending upon other relationships that are made in the design. The rear legs 136 also have a downwardly generally perpendicular leg extension 140 to which a wheel 142 is attached to each side thereof. A rear end brace 144 is provided to interconnect the rear leg extensions 1140. The rear leg 136 has a curved auxiliary support member 146 that is attached to the rear leg 136 and the leg extension 138 by preferably being welded thereto and this support member has a inwardly directed stop member 148 that is positioned to engage the main side strut 114 when it reaches its open position as best shown in FIG. 5. The rear leg 136 is pivotally connected to the side strut 114 by pivot connection 150. A link member 152 is also provided in this embodiment and it has a pivot connection 154 to the end of the rear leg extension 138 and a pivot connection 156 for connecting to the side member 104 of the top frame. The operation of this embodiment is substantially similar to the first embodiment shown in FIGS. 1-4.

When the rolling stand 100 shown in its open position in FIG. 5 is to be moved to its closed position, the handle 134 must be raised to move the side strut 114 upwardly. The rear leg 136 will then pivot in a clockwise direction around pivot point 150 so that the wheel 142 will begin to approach the lower contact point 118 during the closing operation. Also the rear leg extension 136 will move pivot point 154 in a clockwise direction relative to pivot point 150 and cause the front end of the stand to move downwardly so that end 106 will move in a counterclockwise direction pivoting around the opposite pivot connection 116, resulting in the end 106 approaching the lower end of the side strut 114. From a vertical closed position the opposite series of movements will occur as has been described with regard to FIGS. 1-4.

Figure 9:
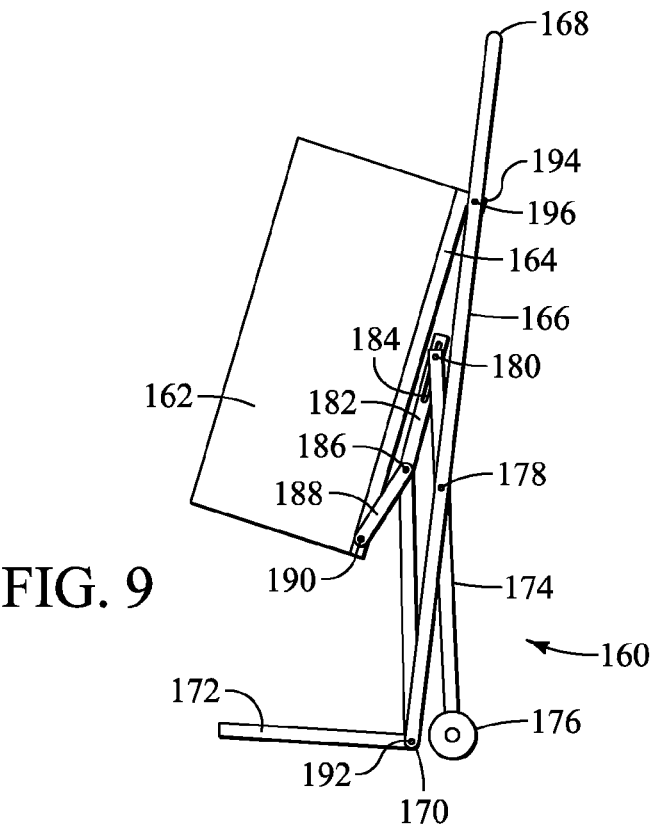
FIG. 9 is a diagrammatic side view of a third preferred embodiment shown with an object attached to the top frame and shown in its closed position.
Figure 10:
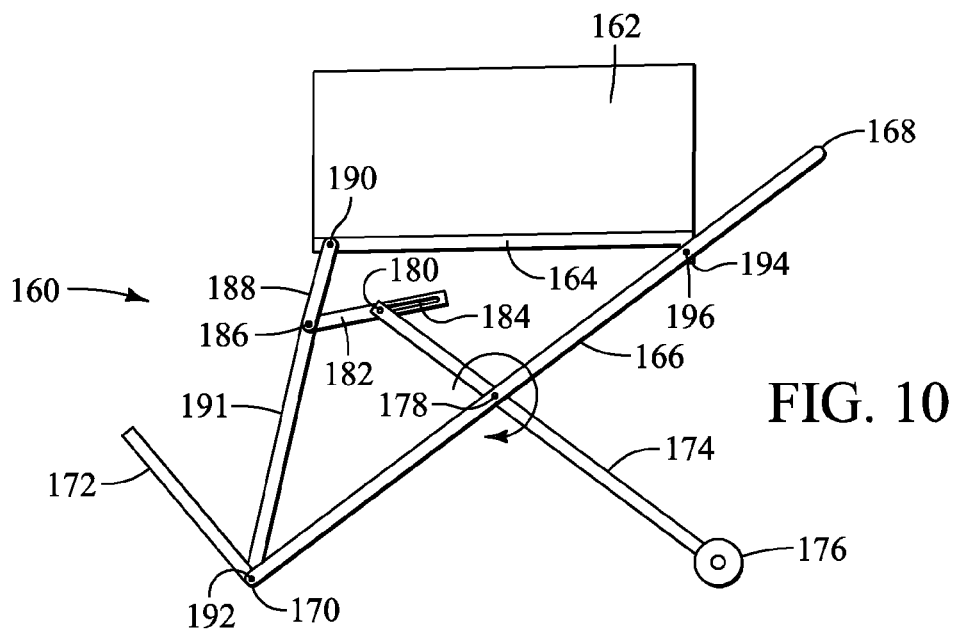
FIG. 10 is another side view of the third preferred embodiment shown in its opened position.

A third preferred embodiment is shown in the FIGS. 9 and 10 in a simplified manner, with a rolling stand, indicated generally at 160, having an object 162 attached to it. As with the embodiment in FIG. 1, the object 162 may certainly be a circular saw, miter saw or other tool. The object 162 is attached to a top frame 164 that is not shown in detail, but which would be similar to the top frame 14 of FIG. 1. The rolling stand 160 has a side strut 166 which extends from a upper handle portion 168 to a bottom contact point 170 and the side strut has a transverse platform extension 172 which is fixed with regard to the side strut 166. A rear leg 174 having a wheel at its lower end is pivotally connected via a pivot connection 178 to the side strut 166. The upper end of the rear leg 174 has a pivot connection 180 to a first link member 182 that has a slot 184 and in which the pivot connection 180 also can slide along the length thereof. The opposite end of the first link member 182 has a pivot connection 186 to a second link member 188 as well as to a third link member 191. The second link member 188 has its opposite end pivotally connected to the top frame 164 by the pivot connection 190. Similarly, the opposite end of the third link 191 has a pivot connection 192 adjacent the lower contact point 170 of the side strut 166. The upper end of the side strut 166 is also connected to the top frame 164 and particularly to a transverse extension 194 wherein a pivot connection 196 permits the side strut 166 to rotate relative to the top frame 164.

To open the rolling stand 160 from the closed position in FIG. 9 to open position in FIG. 10, the user simply pulls the handle 168 to the right as shown in FIG. 9 which will cause the side strut 166 to pivot relative to the lower portion of the rear leg 174 so that the wheel will move away from the contact point 170. Simultaneously, the top end of the rear leg will move in a counterclockwise direction or to the left as shown in FIG. 9 and the pivot connection 180 will slide down the slot 184 as the mechanism opens. The first link member 182 will force the pivot connection 186 in a downward direction as shown in FIG. 9 which will tend to cause the second and third link members 188 and 191 to straighten out relative to one another and cause the top frame 164 to move to a horizontal position as shown in FIG. 10. In this open position, the pivot connection 180 of the rear leg portion will reach the lower end of the slot 184 which will prevent any further movement to the left and will thereby hold the top frame 164 and object 162 in the desired horizontal position.

Figure 11:
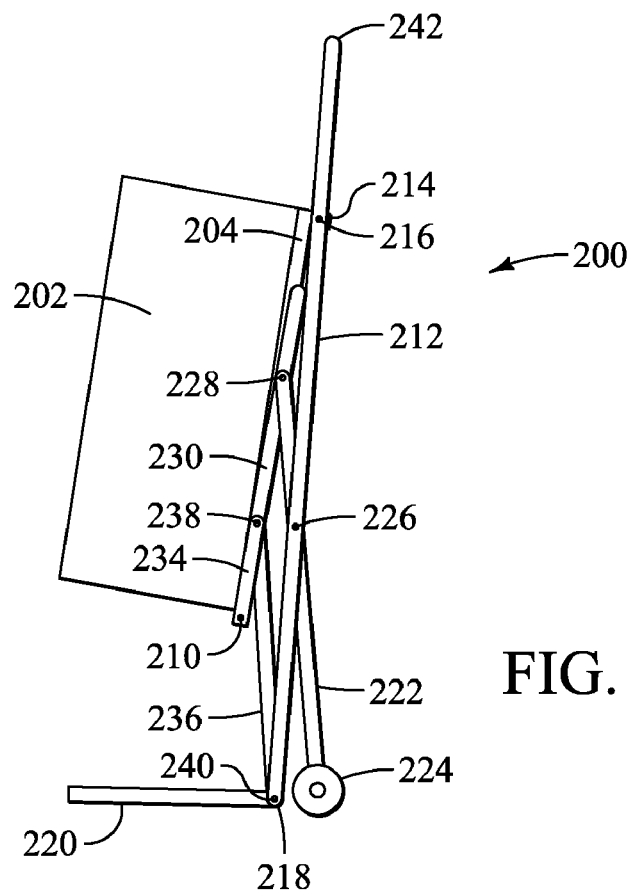
FIG. 11 is a diagrammatic side view of a fourth preferred embodiment shown with an object attached to the top frame and shown in its closed position.
Figure 12:
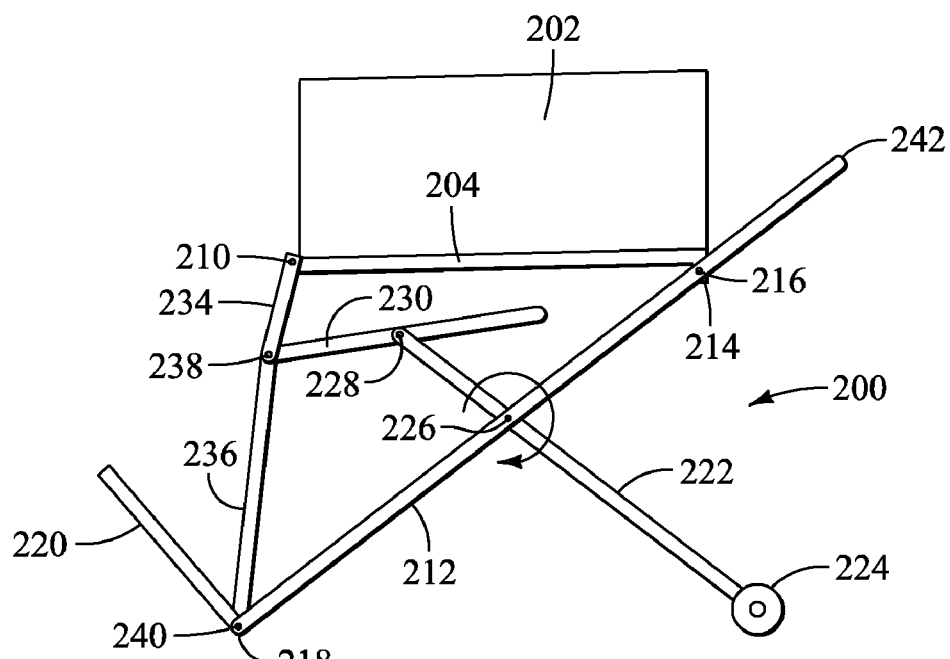
FIG. 12 is another side view of the fourth preferred embodiment shown in its opened position.

A fourth embodiment illustrates a rolling stand 200 with an attached object 202 that is illustrated in a closed position in FIG. 11 and an open position in FIG. 12. The rolling stand 200 has a top frame 204 with pivot connection 210 located at the bottom end as shown in FIG. 11. The rolling stand 200 has a main side strut 212 that is pivotally connected to a transverse extension 214 of the top frame 204 at pivot connection 216. The side strut 212 extends downwardly to a bottom contact point 218 and has a transverse platform extension 220 that is rigid with regard to the side strut 212. A rear leg 222 with an attached wheel 224 is pivotally connected by connection point 226 to the side strut. The upper end of the rear leg 222 has a connection point 228 for connecting to a first link member 230, the other end of which is pivotally connected to a second link 234 and a third link member 236 by pivot connection 238. The other end of the second link member 234 is connected to the top frame 204 by the connection 210 and other end of the third link 236 is connected to the bottom of the side strut 212 adjacent the contact point 218 by pivot connection 240. The upper portion of the side strut 212 terminates at a handle 242.

To open the roller stand 200, user will pull the handle 242 to the right as shown in FIG. 11 which will cause the rear leg 222 below the pivot connection 226 to rotate in a counterclockwise direction so that the wheel 224 separates from the contact point 240 of the side strut 212. This causes the upper end of the rear leg 222 to move the connection 228 left and down thereby moving the first link member downwardly from the position shown in FIG. 11 and also causing the connection 238 to move both the second and third link members 234 and 236 to straighten them relative to one another while simultaneously moving the top frame 204 to its horizontal position.

Figure 13:
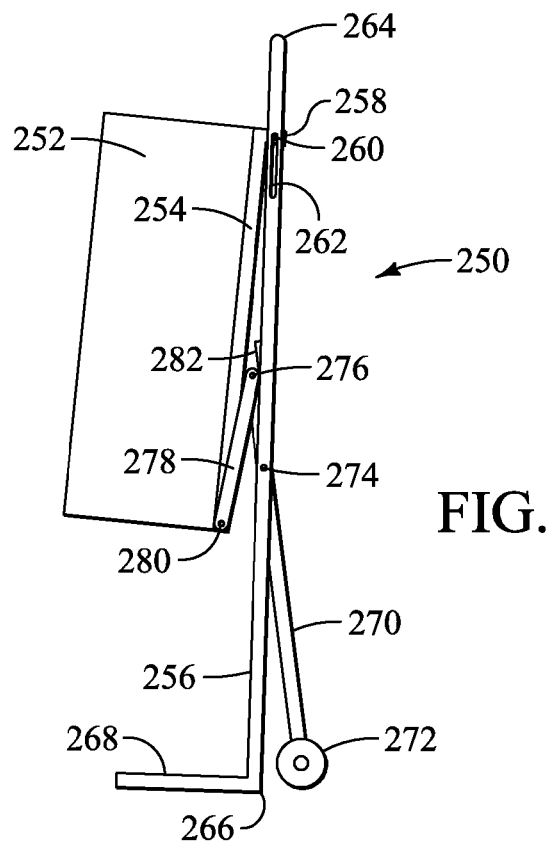
FIG. 13 is a diagrammatic side view of a fifth preferred embodiment shown with an object attached to the top frame and shown in its closed position.
Figure 14:
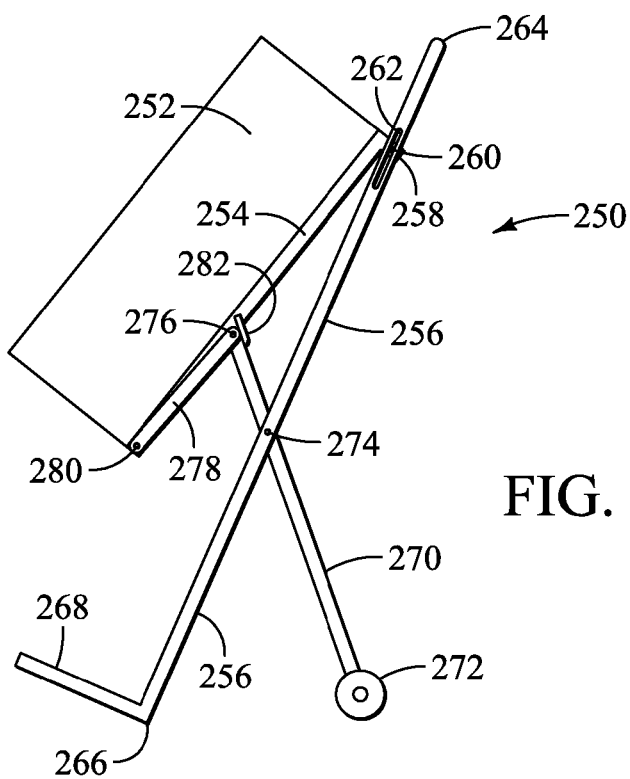
FIG. 14 is a diagrammatic side view of a fifth preferred embodiment shown in its partially opened condition.
Figure 15:
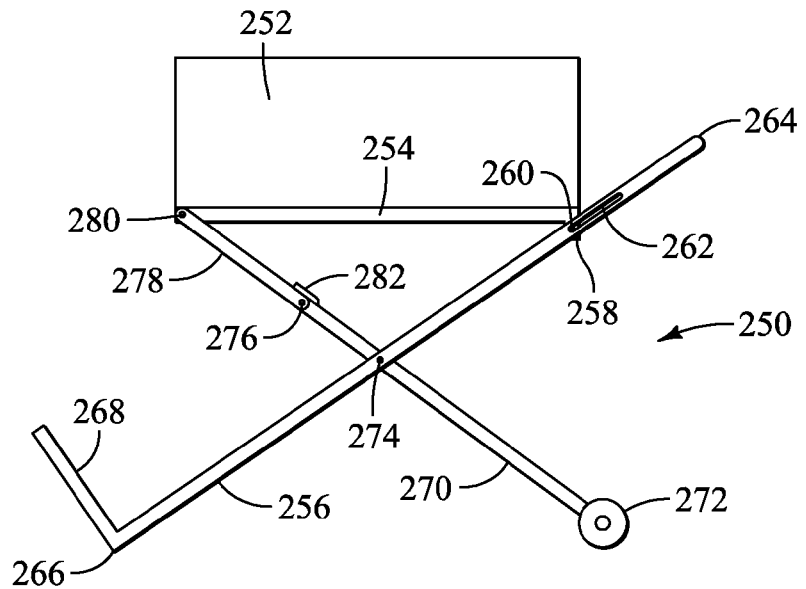
FIG. 15 is another side view of the fifth preferred embodiment shown in its opened position.

A fifth embodiment of the stand is indicated generally at 250, and is shown in FIGS. 13, 14 and 15 together with an object 252 that is attached to a top frame 254 of the stand 250. In this embodiment, a main side strut 256 is attached to an extension 258 of the top frame 254 with a pivot connection 260 that is also slidable in a slot 262. The upper end of the side strut merges with a handle 264. The side strut 256 also has a bottom contact point 266 and a transverse platform extension 268. A rear leg 270 has a wheel 272 attached to the bottom end thereof and is pivotally attached to the side strut by pivot connection 274. At the upper end of the rear leg 270 is a pivot connection 276 that connects to a link member 278 that is pivotally connected to the top frame 254 by pivot connection 280. The connection 276 also includes a stop portion 282 that prevents over center movement, i.e., movement beyond the orientation shown in FIG. 15 where the leg member 278 is in line with the longitudinal axis of the rear leg 270.

To open the embodiment 250 from its closed position shown in FIG. 13 to its completely open position shown in FIG. 15, a user again pulls the handle 264 to the right which causes relative pivoting movement between the side strut 256 and the lower portion of the rear leg 270 so that the wheel 272 moves away from the contact point 266, which in turn causes the upper end of the rear leg 270 to rotate in a counterclockwise direction and move the link member 178 so that it pivots in a clockwise direction around pivot connection 280 until it is generally aligned with the lengthwise direction of the rear leg 270 and the stop 282 halts its further movement. While it is shown to be straight relative to the rear leg 270 in FIG. 15, depending upon the relative lengths of the rear leg and link member 278 and the position of the pivot connection 274 along the side strut 256, the movement of the link member 278 may rotate beyond what is shown in FIG. 15, and would be similar to that shown in FIG. 18 which has yet to be described.

To close the rolling stand 250 from the open position shown in FIG. 15, it is only necessary to push the handle 264 to the left as shown in FIG. 15 while perhaps unlocking the stop 282 if necessary. Further movement of the handle 264 will cause the stand to move toward the closed position shown in FIG. 13.

Figure 16:
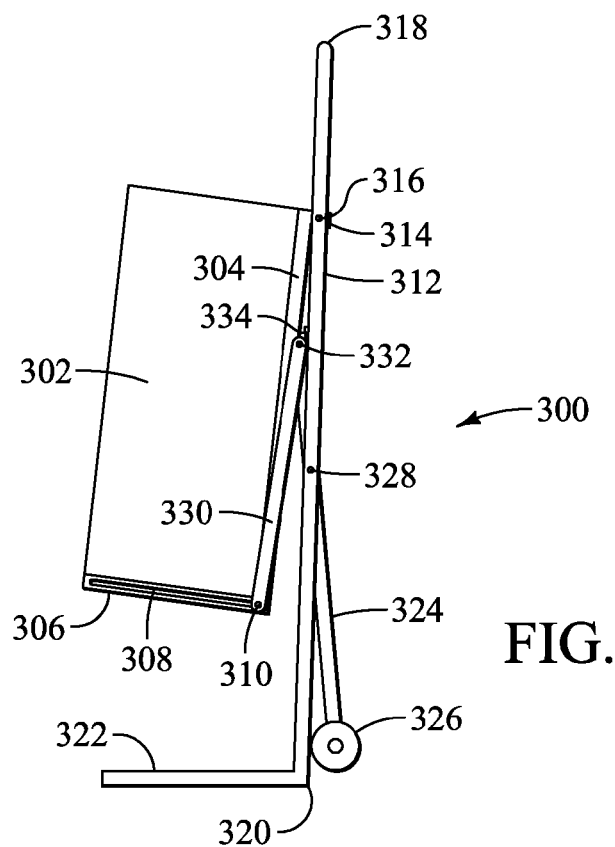
FIG. 16 is a diagrammatic side view of a sixth preferred embodiment shown with an object attached to the top frame and shown in its closed position.
Figure 17:
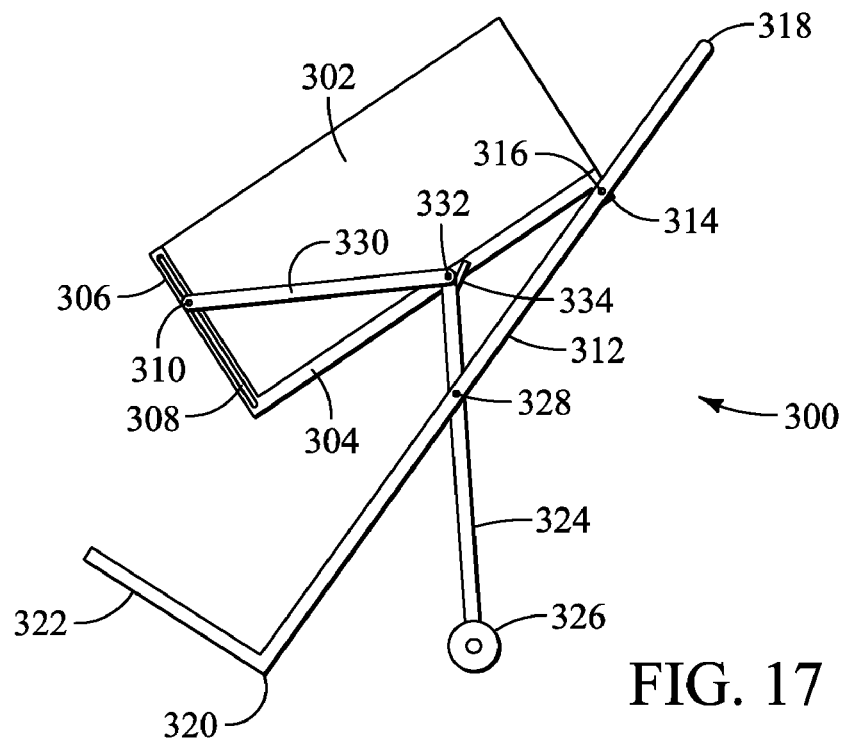
FIG. 17 is a diagrammatic side view of a sixth preferred embodiment shown in its partially opened condition.
Figure 18:
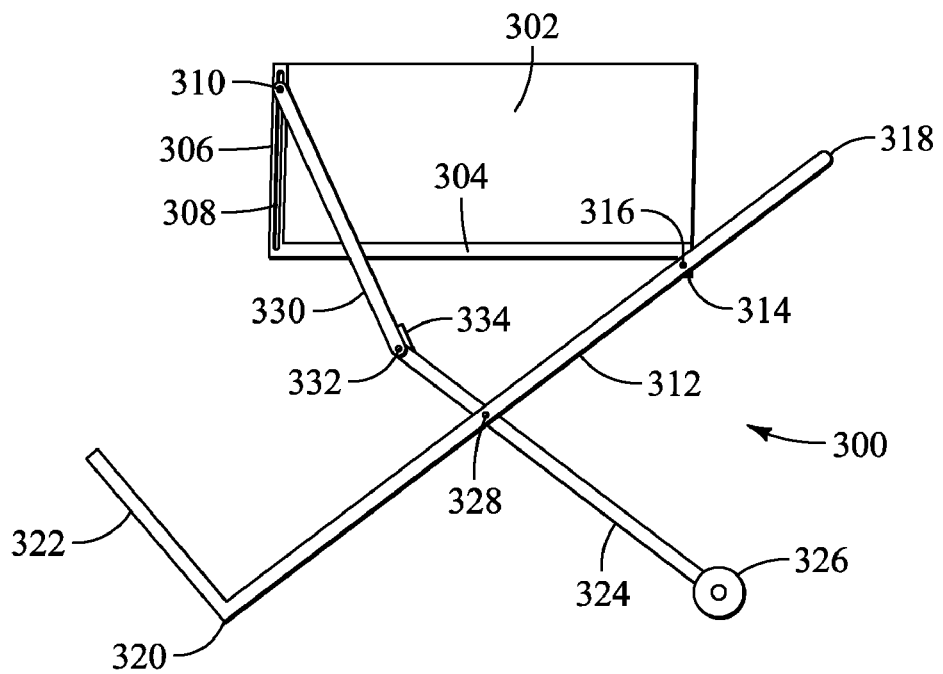
FIG. 18 is another side view of the sixth preferred embodiment shown in its opened position.

A sixth embodiment of the rolling stand is indicated generally at 300 and is shown in its closed position in FIG. 16, an intermediate position in FIG. 17 and an open position in FIG. 18 and is shown with an object 302 that is attached to the stand. In this embodiment, the stand 300 has a top frame 304 with a transverse extension 306 at the forward end thereof which has a slot 308 in which a pivot and sliding connection 310 is located. A main side stmt 312 is pivotally connected to an extension 314 of the top frame 304 by pivot connection 316. The upper end of the side strut 312 merges with a handle 318 and the lower end thereof has a ground contact point 320 and a transverse platform extension 322. A rear leg 324 has a wheel 326 connected to the lower portion thereof and the leg is pivotally connected to the side strut at pivot connection 328. The upper end of the rear leg 324 is connected to a link member 330 by pivot connection 332. The other end of the link member 330 is connected to the extension 306 by the pivot connection 310 previously identified. The pivot connection 332 also has a over center stop member 334 that limits the pivoting movement of the rear leg 324 relative to the link member 330 essentially to that which is shown in FIG. 18. In this embodiment, when the stand is to be opened from the closed position shown in FIG. 16 to the open position shown in FIG. 18, the handle 318 is pulled to the right which causes the lower portion of the rear leg 324 to pivot around pivot connection 328 and the wheel 326 will be separated from the contact point 320. As this motion occurs, the pivot connection 332 at the upper end of the rear leg 324 will cause the link member 330 to open relative to the rear leg member 324 and simultaneously cause the pivot and sliding connection 310 to move from the right end of the slot 308 as shown in FIG. 16 toward the left or upper end thereof as shown in FIG. 17. When it is in its final open position, the sliding pivot connection 310 will be at the upper end of the slot 308 and the top frame 304 and object 302 will be substantially horizontal.

A seventh embodiment of a rolling stand of the present invention is indicated generally at 350 in FIGS. 19-22 and is shown with an object 352 attached to it. In this embodiment, a top frame 354 has a forward transverse extension 356 with a slot 358 in which a pivot connection 360 is located. The stand 350 has a side strut 362 with a bottom contact point 364 and a transverse platform extension 366. The side strut 362 is pivotally connected to another extension 368 of the top frame 354 by a pivot connection 370 and the upper end of the side strut 362 emerges into a handle 372. A rear leg 374 has a wheel 376 mounted to the lower end thereof and a link member 378 is connected to the pivot connection 360 and to a gear mechanism indicated generally at 380. In this embodiment, the side strut 362 has an enlarged portion 381 in the area of the gear mechanism 380. In this embodiment, the upper end of the rear leg 374 has a round toothed gear 382 securely attached to it, which may be accomplished by having an irregular shaped hub 384 welded or otherwise attached to the leg 374, with the gear 382 having an internal configuration that is complementary to the shape of the hub 384 so that it cannot rotate relative to the hub. The gear and leg 374 can rotate relative to a pin 386 that is operatively connected the side strut 362. Thus, the gear 382 and leg 374 are capable of rotating relative to the side strut.

Figure 19:
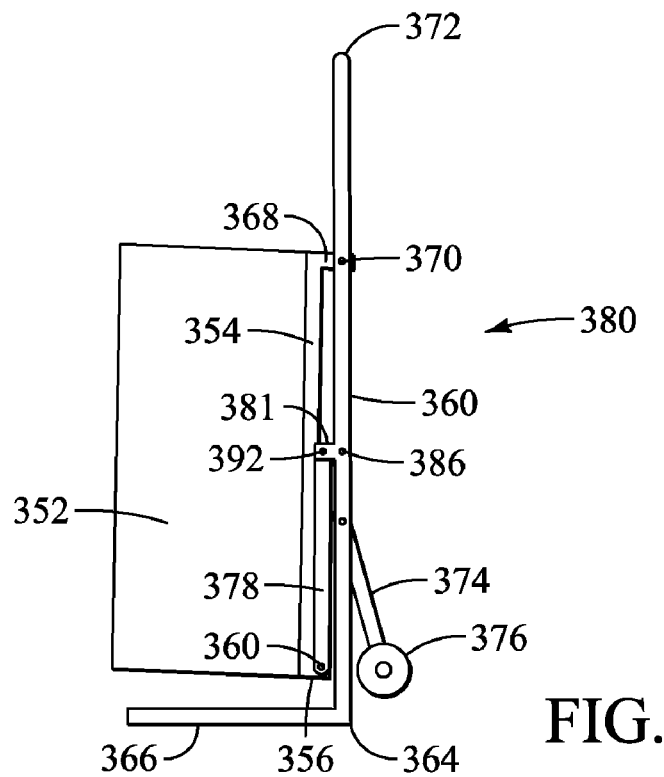
FIG. 19 is a diagrammatic side view of a seventh preferred embodiment shown with an object attached to the top frame and shown in its closed position.
Figure 20:
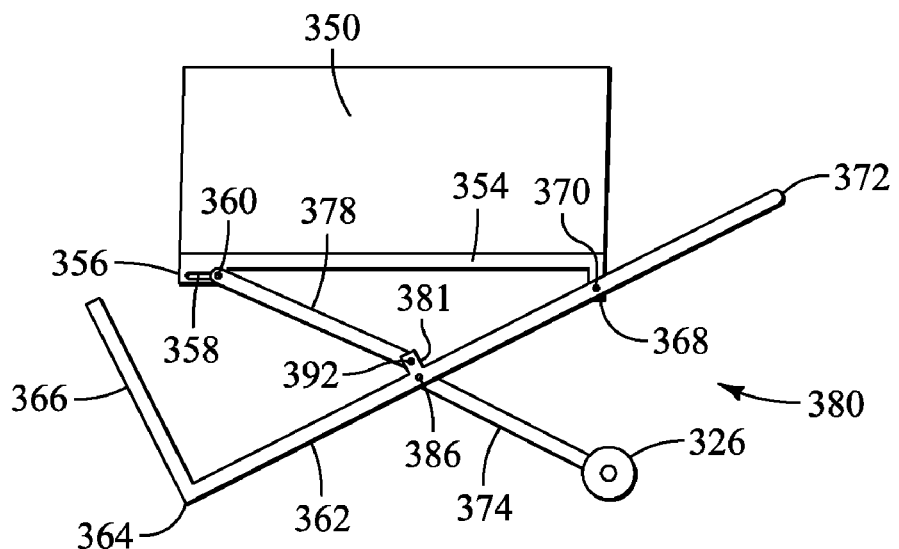
FIG. 20 is another side view of the seventh preferred embodiment shown in its opened position.
Figure 21:
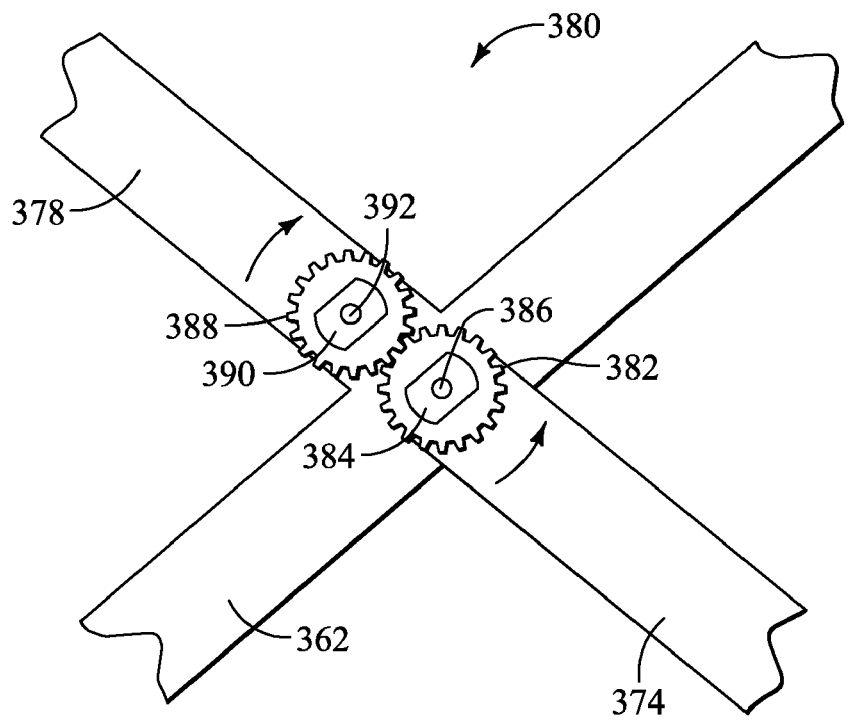
FIG. 21 is a side view of a portion of the seventh embodiment, particularly illustrating the gear mechanism that interacts with the first member, the second member and the link member.
Figure 22:
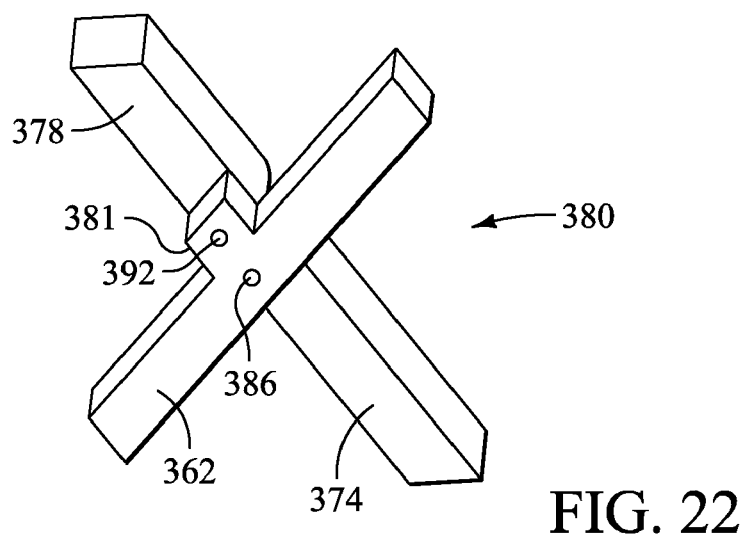
FIG. 22 is a perspective view, particularly illustrating the shape of the first member and the interconnection with the second member and the link member.

A toothed gear 388 is fixed to the link member 378 by a hub 390 that is complementary configured to the interior of the gear 388, but which is rotatable around pin 392 which is also fixed to the enlarged portion 1381 of the side strut 362. The gears 388 and 382 have teeth that engage one another so that rotation of the rear leg 374 in one rotational connection will result in rotation of the link member 378 in the opposite direction. As shown in FIGS. 19 and 21, if the rear leg 374 is rotated in the counterclockwise direction, the link member 378 will then be rotated in the clockwise direction. If it is in the closed position shown in FIG. 19, rotating the rear leg 374 in a counterclockwise direction will cause the link member 378 to rotate in the clockwise direction and the stand will be moved from its closed position shown in FIG. 19 to its open position in FIG. 20. The slot 358 permits some necessary translating movement to occur when this unfolding operation.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A collapsible rolling stand for use with an elongated normally horizontally oriented object attached thereto, said stand being supported by a ground surface and having a front end portion and a rear end portion, and being capable of being manipulated between open and closed positions, wherein the object is generally vertically oriented when the stand is closed and generally horizontally oriented when the stand is in the open position, said stand comprising:
   a top frame having a generally planar portion being configured to have the object secured thereto, said top frame planar portion being oriented in a generally horizontal position when said stand is in the open position and a generally vertical position when said stand is moved to the closed position;
   a pair of spaced apart elongated first members, each located on opposite sides of said top frame and pivotably connected at one end portion to a rear portion of said top frame planar portion, each of said first members also having an opposite end portion that include a point that contact the ground surface;
   a pair of spaced apart second members, each having a wheel for enabling a user to roll said stand on the ground surface and a pivot connection to one of said first members at a point intermediate said one end and opposite end portions of said first member, each second member also having one of said wheels connected to a lower end portion thereof and an upper end portion extending upwardly beyond said pivot connection;
   a pair of first link members, each having a first end portion pivotally connected to said upper end portion of said second member and a second end portion pivotally connected to a first end of a second link member;
   said pair of second link members each having a first end pivotally connected to said second end portion of said first link member and to a first end of a third link member, and a second end pivotally connected to one side of said top frame; and
   said pair third link members, each having a first end pivotally connected to said first end of said second link member and to said second end portion of said first link member, and a second end pivotally connected near said point of one of said first members that contact the ground surface;
   wherein said first and second members are pivotally connected to one another and configured so that the weight of the object provides a substantial portion of the necessary force needed to pivot said first and second pairs of members to further separate said points of said first members that contact the ground surface from said wheels and move said stand from the closed position to the open position wherein said top frame planar portion is substantially horizontal.

2. The stand as defined in claim 1 further comprising:
   a handle connected to at least one of said first members;
   wherein when said stand is in the closed position, pulling said handle downwardly enables said second members to pivot about said pivot connections, causing the weight of the object to move said second members and wheels away from said top frame in a pivoting movement in a rearward direction, causing said upper end of said second members to move said first link members downwardly and move the first ends of said second and third link members forwardly, so said second and third link members become substantially straight relative to one other as said stand moves to the open position, where the top frame planar portion is oriented in the substantially horizontal position.

3. The stand as defined in claim 1 further comprising a generally transverse extension extending from each of the opposite end portions of said first members at said points that contact the ground surface.

4. The stand as defined in claim 1 wherein said one end portion of said first members are pivotally connected to said rear portion of said top frame planar portion via a transverse extension extending from said top frame plane portion.

5. The stand as defined in claim 1 wherein the object is a portable table saw.

6. A collapsible rolling stand for use with a portable table saw attached thereto, said stand being supported by a ground surface and having a front end portion and a rear end portion, and being capable of being manipulated between open and closed positions, wherein the table saw is generally vertically oriented when the stand is closed and generally horizontally oriented when the stand is in the open position, said stand comprising:
- a top frame having a generally planar portion being configured to have the table saw secured thereto, said top frame planar portion being oriented in a generally horizontal position when said stand is in the open position and a generally vertical position when said stand is moved to the closed position;
- a pair of spaced apart elongated first members, each located on opposite sides of said top frame and pivotably connected at one end portion to a rear portion of said top frame planar portion, each of said first members also having an opposite end portion that include a point that contact the ground surface;
- a pair of spaced apart second members, each having a wheel for enabling a user to roll said stand on the ground surface and a pivot connection to one of said first members at a point intermediate said one end and opposite end portions of said first member, each second member also having one of said wheels connected to a lower end portion thereof and an upper end portion extending upwardly beyond said pivot connection;
- a pair of first link members, each having a first end portion pivotally connected to said upper end portion of said second member and a second end portion pivotally connected to a first end of a second link member;
- said pair of second link members each having a first end pivotally connected to said second end portion of said first link member and to a first end of a third link member, and a second end pivotally connected to one side of said top frame; and
- said pair third link members, each having a first end pivotally connected to said first end of said second link member and to said second end portion of said first link member, and a second end pivotally connected near said point of one of said first members that contact the ground surface;
- wherein said first and second members are pivotally connected to one another and configured so that the weight of the table saw provides a substantial portion of the necessary force needed to pivot said first and second pairs of members to further separate said points of said first members that contact the ground surface from said wheels and move said stand from the closed position to the open position wherein said top frame planar portion is substantially horizontal.

7. The stand as defined in claim 6 further comprising:
a handle connected to at least one of said first members;
wherein when said stand is in the closed position, pulling said handle downwardly enables said second members to pivot about said pivot connections, causing the weight of the table saw to move said second members and wheels away from said top frame in a pivoting movement in a rearward direction, causing said upper end of said second members to move said first link members downwardly and move the first ends of said second and third link members forwardly, so said second and third link members become substantially straight relative to one other as said stand moves to the open position, where the top frame planar portion and said table saw are oriented in the substantially horizontal position.

* * * * *